United States Patent [19]

Iida

[11] Patent Number: 4,994,958
[45] Date of Patent: Feb. 19, 1991

[54] CONTROL APPARATUS FOR AUTOMOBILE AIR-CONDITIONERS

[75] Inventor: Katsumi Iida, Konan, Japan
[73] Assignee: Diesel Kiki Co., Ltd., Tokyo, Japan
[21] Appl. No.: 344,392
[22] Filed: Apr. 28, 1989

[30] Foreign Application Priority Data

May 20, 1988 [JP] Japan .................. 63-123566

[51] Int. Cl.⁵ .................. G05D 23/00; B60H 3/00
[52] U.S. Cl. ........................ 364/148; 165/43; 236/13
[58] Field of Search .............. 165/27, 43; 236/13, 236/91 D; 364/140, 148

[56] References Cited

U.S. PATENT DOCUMENTS

| | | | |
|---|---|---|---|
| 4,291,749 | 9/1981 | Ootsuka et al. | 165/27 |
| 4,408,712 | 10/1983 | Naganoma et al. | 165/43 X |
| 4,602,675 | 7/1986 | Kobayashi | 236/49.3 X |
| 4,685,508 | 8/1987 | Iida | 165/28 X |
| 4,697,734 | 10/1987 | Ueda | 165/16 X |
| 4,830,098 | 5/1989 | Okura et al. | 165/43 X |

FOREIGN PATENT DOCUMENTS 57-7714 1/1982 Japan .

Primary Examiner—Parshotam S. Lall
Assistant Examiner—Edward R. Cosimano
Attorney, Agent, or Firm—Wenderoth, Lind & Ponack

[57] ABSTRACT

A control apparatus for an automobile air-conditioner includes a cooled air bypass passage provided independently of a main airflow passage for bypassing cooled air from an evaporator directly to a vent outlet; an opening calculation unit for calculating an opening of a cooled air bypass door based on a detected temperature and a desired temperature in the vicinity of the driver's head, and a drive unit for actuating the cooled air bypass door based on an opening calculated by the opening calculation unit. With this construction, the control apparatus is capable of controlling the temperature in the vicinity of the driver's head independently of a temperature control achieved by the main airflow passage.

3 Claims, 3 Drawing Sheets

CONTROL APPARATUS FOR AUTOMOBILE AIR-CONDITIONERS

BACKGROUND OF THE INVENTION

1. Field of the Invention

The present invention relates to a control apparatus for an automobile air-conditioner having a cooled air bypass passage for supplying cooled air to a vent outlet independently of a main airflow passage.

2. Description of the Prior Art

A cooled air bypass passage for supplying cooled air to a vent outlet is provided for controlling the temperature of air in the vicinity of the driver's head without exerting any influence upon the temperature control in the vicinity of the driver's feet, thereby providing a comfortable air-conditioning in which the head is kept cool while the feet are kept warm. According to a conventional control of the bypass passage, such as that shown in Japanese Patent Laid-open Publication No. 57-7714, for example, the bypass passage is shifted from the fully closed state to the full open state when the temperature of the upper part of a vehicle compartment exceeds the temperature of the lower part by a predetermined value, or when the radiant heat of the sun exceeds a predetermined value.

As described above, in the conventional control system, the supply of cooled air through the bypass passage is controlled based on the temperature difference between the upper and lower portions of the vehicle compartment or the radiant heat of the sun. This means that the full opening of the bypass passage for supplying cooled air is achieved based upon such a prediction that an increase of each control factor beyond the respective predetermined value necessarily causes a temperature rise in the upper part of the vehicle compartment. Such a conventional control based on the prediction does not guarantee a comfortable air conditioning effect in the vicinity of the driver's head.

SUMMARY OF THE INVENTION

It is accordingly an object of the present invention to provide a control apparatus for automobile air-conditioners capable of keeping the driver's head cool and the feet warm, thus providing a sense of comfort to the human being.

Another object of the present invention is to provide a control apparatus for automobile air-conditioners which is capable of maintaining the temperature of air in the vicinity of the driver's head at a predetermined target or desired value even when the temperature of air exhausted from the main airflow duct fluctuates with a change in the environment.

According to the present invention, there is provided a control apparatus for an automobile air-conditioner, comprising: an airflow duct having defined therein a main airflow passage and a cooled air bypass passage, the main airflow passage having an evaporator disposed therein and a vent outlet at a downstream end thereof, the cooled air bypass passage bypassing the main airflow passage between a downstream side of the evaporator and the vent outlet for supplying cooled air from the evaporator directly to the vent outlet; a cooled air bypass door disposed in the cooled air bypass passage for regulating the amount of cooled air flowing through the cooled air bypassing passage; a representative temperature detection means for detecting a representative temperature in a vehicle compartment; a vehicle compartment temperature setting means for setting a desired vehicle compartment temperature; a total signal calculation means for calculating a total signal corresponding to a thermal load in the vehicle compartment, based on at least the representative temperature and the desired vehicle compartment temperature; a control means for controlling temperature control mechanisms of the main airflow passage based on said total signal, for achieving a basic temperature control of the vehicle compartment; an upper-part temperature detection means for detecting a temperature of an upper part of the vehicle compartment in the vicinity of the driver's head; an upper-part temperature setting means for setting a desired temperature for the upper part of the vehicle compartment; a desired upper-part temperature calculation means for calculating a desired upper-part temperature based on at least the desired upper-part temperature set by the upper-part temperature setting means; an opening calculation means for calculating an opening of the cooled air bypass door which is required to make the upper-part temperature equal to the desired upper-part temperature; and a drive means for moving the cooled air bypass door to a position in which said cooled air bypass door assumes the opening calculated by the opening calculation means.

With this construction, the opening of the cooled air bypass door is determined not by the total signal but by the result a calculation signal output from said opening calculation means. Consequently, when the upper-part temperature is caused to deviate from the desired upper-part temperature due to a change of environment inside and outside the vehicle compartment, a supply of cooled air to the vent outlet is varied independently of the main temperature control achieved by using the main airflow passage, thereby immediately regulating the upper-part temperature so as to become equal to the desired upper-part temperature.

Many other advantages and features of the present invention will become manifest to those versed in the art upon making reference to the detailed description and the accompanying sheets of drawings in which a preferred structural embodiment incorporating the principles of the present invention is shown by way of the illustrative example.

DETAILED DESCRIPTION

The present invention will be described herein below in greater detail with reference to an embodiment shown in the accompanying drawings.

Figure 1:
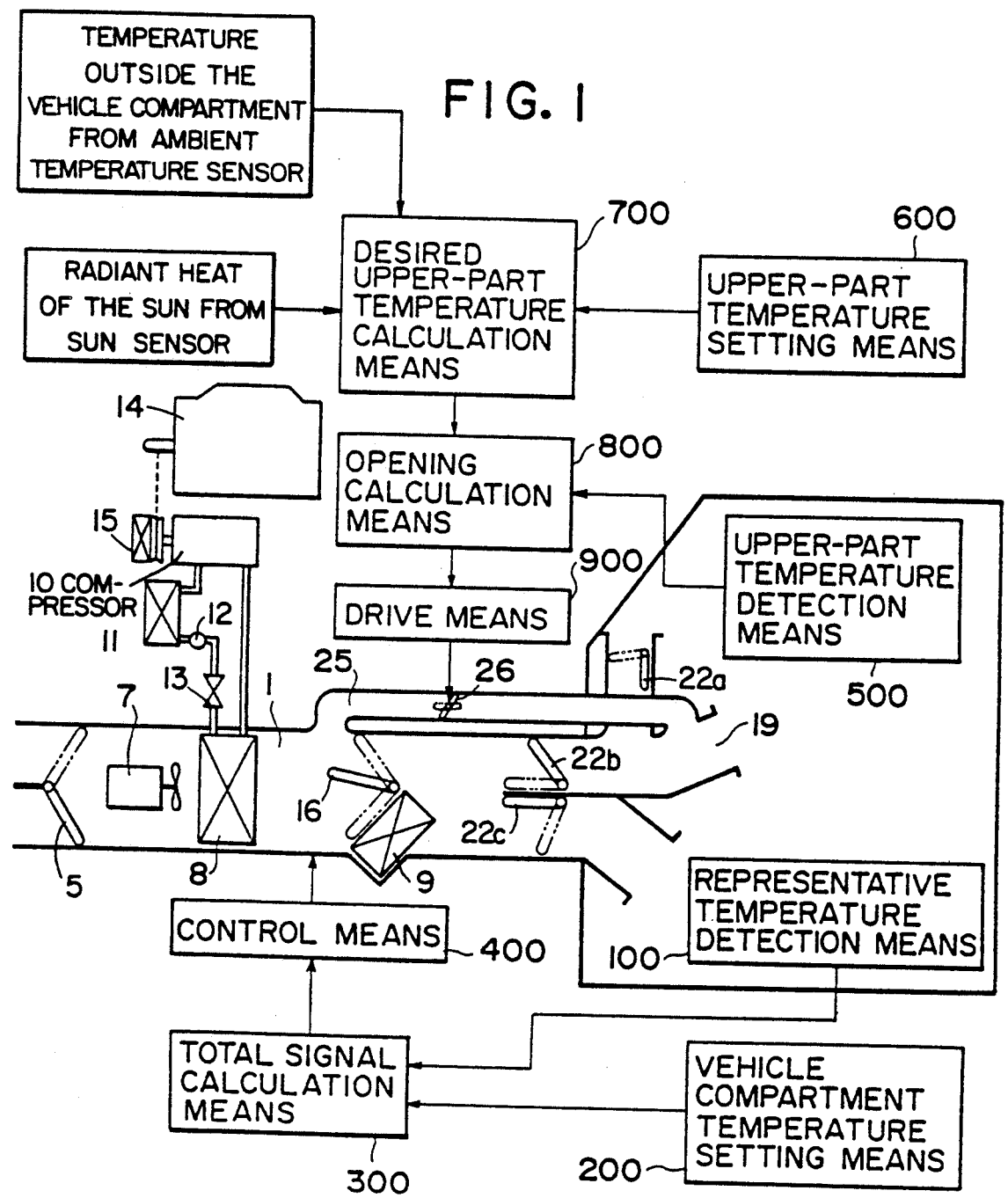
FIG. 1 is a block diagram showing the general construction of a control apparatus for an automobile air-conditioner according to the present invention.

FIG. 1 shows the basic concept of the present invention.

A control apparatus for an automobile air-conditioner, comprising: an airflow duct having defined therein a main airflow passage 1 and a cooled air bypass passage 25, the main airflow passage 1 having an evaporator 8 disposed therein and a vent outlet 19 at a downstream end thereof, the cooled air bypass 25 bypassing the main airflow passage 1 between a downstream side of the evaporator 8 and the vent outlet 19 for supplying cooled air from the evaporator 8 directly to the vent outlet 19; a cooled air bypass door 26 disposed in the cooled air bypass passage 25 for regulating the amount of cooled air flowing through the cooled air bypassing passage 25; representative temperature detection means 100 for detecting a representative temperature in a vehicle compartment; vehicle compartment temperature setting means 200 for setting a desired vehicle compartment temperature; total signal calculation means 300 for calculating a total signal corresponding to a thermal load in the vehicle compartment, based on at least the representative temperature and the desired vehicle compartment temperature; control means 400 for controlling temperature control mechanisms of the main airflow passage 1 based on said total signal, for achieving a basic temperature control of the vehicle compartment; upper-part temperature detection means 500 for detecting a temperature of an upper-part of the vehicle compartment in the vicinity of the driver's head; upper-part temperature setting means 600 for setting a desired temperature for the upper-part of the vehicle compartment; desired upper-part temperature calculation means 700 for calculating a desired upper-part temperature based on at least the desired upper-part temperature set by the upper-part temperature setting means 600; opening calculation means 800 for calculating an opening of the cooled air bypass door 26 which is required to make the upper-part temperature; and drive means 900 for actuating the cooled air bypass door 26 to a position in which said cooled air bypass door 26 assumes the opening calculated by the opening calculation means 800.

Figure 2:
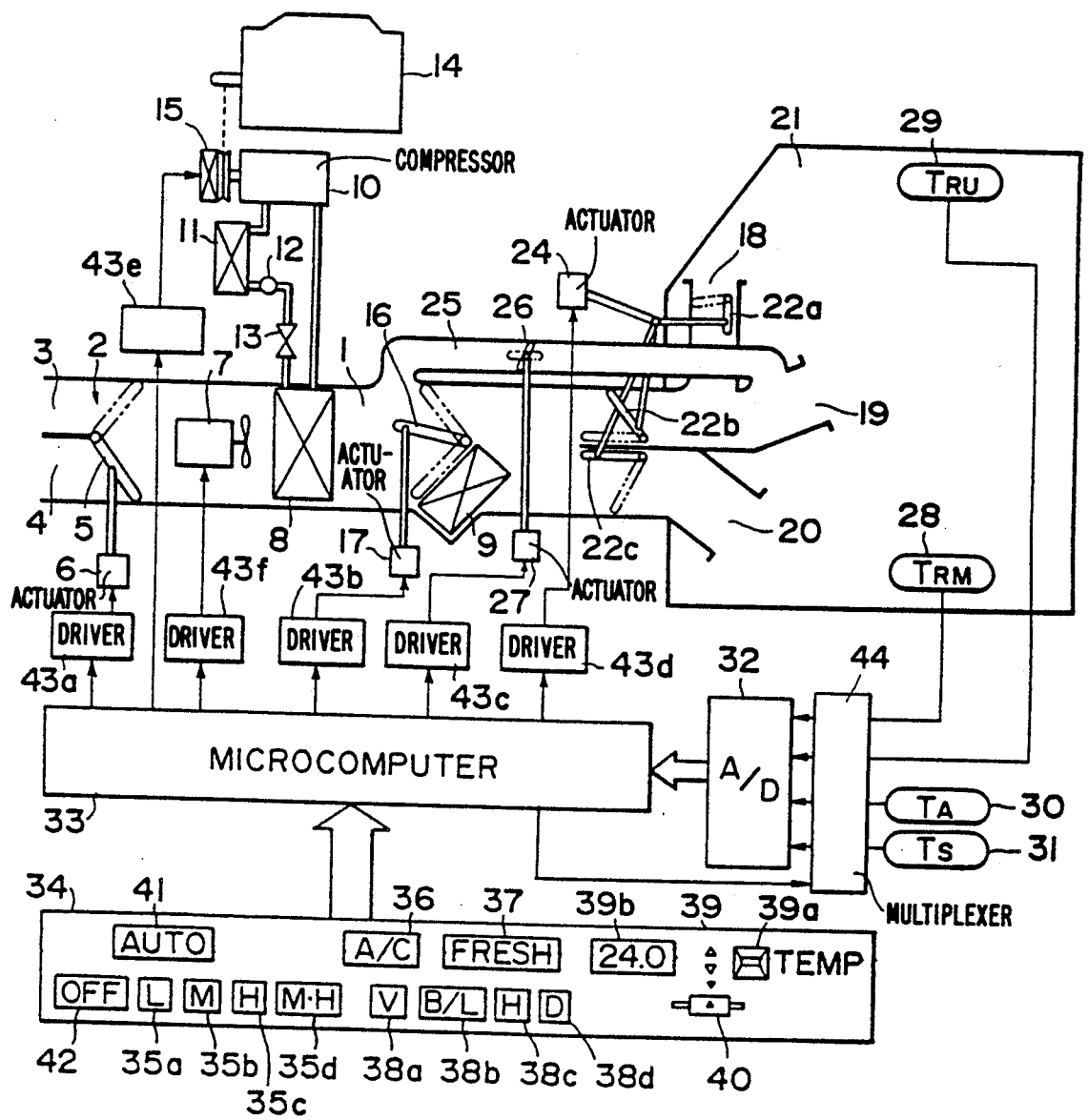
FIG. 2 is a diagrammatical view illustrative of the structural details of the automobile air-conditioner control apparatus.
Figure 3:
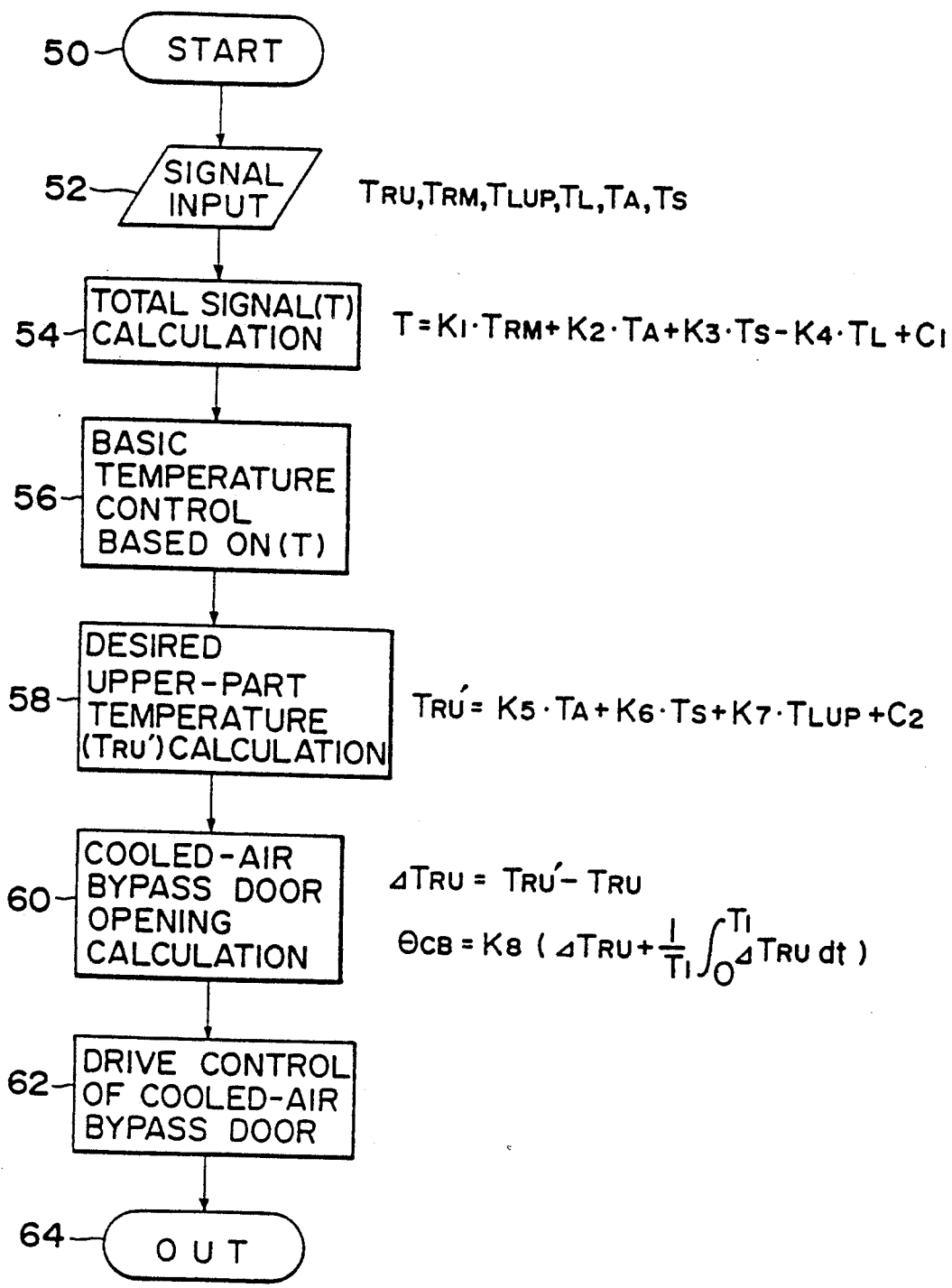
FIG. 3 is a flowchart showing a control routine achieved in a microcomputer incorporated in the control apparatus for controlling the temperature of air in the vehicle compartment.

Each means in FIG. 1 corresponds to the following elements shown in FIGS. 2 and 3. The representative temperature detection means 100 corresponds to the vehicle compartment temperature sensor 28. The vehicle compartment temperature setting means 200 corresponds to the temperature setter 39. The total signal calculation means 300 corresponds to the step 54. The control means 400 comprises the actuator 17 and the driver circuit 43b. The upper-part temperature setting means 500 corresponds to the upper-part temperature sensor 29. The upper-part temperature setting means 600 corresponds to an upper-part temperature setter 40. The desired upper-part temperature calculation means 700 corresponds to the step 58. The opening calculation means 800 corresponds to the step 60. The drive means 900 comprises the actuator 27 and driver circuit 43c.

As shown in FIG. 2, an automobile air-conditioner includes an airflow duct defining therein a main airflow passage 1 and an intake door changeover device 2 at the upstream end of the main airflow passage 1. The intake door changeover device 2 includes a selecting door 5 disposed at the junction between a recirculated air inlet 3 and an outside air inlet 4 that are provided in bifurcated fashion. The selecting door 5 is operatively connected to an actuator 6 and driven by the latter to select one of the inlets 3, and 4 for allowing the recirculated air or the outside air to be drawn into the main airflow passage 1.

A blower 7 is disposed in the main airflow passage 1 immediately downstream of the changeover device 2 to force the air downstream through the main air flow passage 1. The main airflow passage 1 is also includes an evaporator 8 and a heater core 9 disposed downstream of the blower 7 in the order named.

The evaporator 8 is connected in fluid circuit with a compressor 10, a condenser 11, a receiver tank 12 and an expansion valve 13 so as to constitute jointly therewith a refrigeration system performing a refrigeration cycle. The compressor 12 includes an electromagnetic clutch 15 for selectively connecting the compressor 10 to an engine 14 of the motor vehicle. The electromagnetic clutch 15 is engaged and disengaged to undertake an on-off control of the operation of the compressor 10. The heater core 9 serves to heat the air passing therethrough by the heat taken up from an the engine cooling water which is recirculating through the heater core 9. An air-mix door 16 is disposed between the evaporator 8 and the heater core 9 and is movable under the control of an actuator 17. The opening of the air-mix door 16 is regulated by the actuator 17 for adjustably changing the ratio of the amount of air flowing directly through the heater core 9 and the amount of air bypassing the heater core 9, so that the temperature of air to be exhausted blown from the airflow duct is controlled at a desired value.

The main airflow passage 1 has at its downstream end a defroster outlet 18, a vent outlet 19 and a heat outlet 20 that are provided in branched fashion and all open to a vehicle compartment 21. Three mode doors 22a, 22b, 22c are disposed adjacent to the respective outlets 18–20. The operation of mode doors 22a–22c is controlled by an actuator 24 for selecting a desired mode of operation of the air-conditioner.

The airflow passage 1 further includes a cooled air bypass passage 25 for bypassing a portion of the main airflow passage 1. The cooled air bypass passage 25 has an upstream end connected to the main air flow passage 1 at a position between the evaporator 8 and the heater core 9 and a downstream end connected to the main air flow passage 1 at a position immediately upstream of the vent outlet 19, so that a part of air which has passed through the evaporator 8 is supplied directly to the vent outlet 19 through this bypass passage 25. The amount of cooled air to be supplied through the bypass passage 25 is regulated by controlling the opening of cooled air bypass door 26 which is disposed in the bypass passage 25 and operative under the control of an actuator 27.

A vehicle compartment temperature sensor 28 is disposed on a floor, an instrument panel or a similar part for detecting a representative temperature TRM in the vehicle compartment 21. An upper-part temperature sensor 29 is disposed on the inside surface of a roof panel, for example, for detecting the temperature TRU of an upper part of the vehicle compartment 21. Designated by 30 is an outside air temperature sensor for detecting the temperature TA outside the vehicle compartment 21. Reference character 31 denotes a sunlit portion temperature sensor for detecting the temperature Ts of a vehicle compartment portion which is exposed to the incident light of the sun (the radiant heat of the sun). Output signals from the respective sensors 28 through 31 are inputted into a multiplexer 44 which selectively delivers one of the four input signals into an A/D converter 32 in accordance with commands from a microcomputer 33 which in the A/D converter 32 digitizes the input signals and then delivers the digital signals to the microcomputer 33.

The microcomputer 33 is also supplied with output signals from an instrument panel 34. The instrument panel 34 is provided with a series of manual switches 35a through 35d for selectively changing the rotational speed of the blower 7 between range of levels consisting of low (L) by switch 35a, medium (M) by switch 35b, high (H) by switch 35c, and maximum high (MH) by switch 35d, a start switch (A/C) 36 for starting the compressor 10, a changeover switch 37 (FRESH) for selecting either the recirculated air or the outside air to be introduced into the airflow duct, four mode switches 38a through 38d for selecting a discharge mode of the exhaust air which includes a vent mode (V) by switch 38a, a bi-level mode (B/L) by switch 38b, a heat mode (H) by switch 38c and a defroster mode (D) by switch 38d, a temperature setter 39 for setting the temperature in the vehicle compartment 21 at a desired value (TL), an upper-part temperature setter 40 for setting the temperature of the upper part of the vehicle compartment 21 at a desired value (TLUP), an automatic switch (AUTO) 41 for automatically controlling the rotational speed of the blower 7 and the air intake and exhaust modes, and an off switch (OFF) 41 for forcibly placing all the switches stated above in their off state.

The temperature setter 39 is composed of an up-down switch 39a and a display unit 39b associated therewith. The upper-part temperature setter 40 is of the slide type and capable of setting the temperature in a range of several degrees around at 25° C.

The microcomputer 33 is of the conventional type known per se and comprises a central processing unit (CPU), a read only memory (ROM), a random access memory, (RAM) and an input/output port (I/0), none of which is shown. The microcomputer 33 operates to calculate control signals based on the various inout signals set forth above and to deliver the control signals through respective driver circuits 43a–43f to the actuators 6, 17, 27 and 24, the compressor 10 and a motor of the blower 7 for controlling the operation of the various doors 5, 16, 22a, 22b, 22c, 26, the on-off operation of the compressor 10 and the rotation of the blower motor.

The operation of the microcomputer 33 is described below with reference to a flowchart shown in FIG. 3 in which a control routine for the air-conditioning of the vehicle compartment 21 is illustrated.

The control routine of the microcomputer 33 starts in a step 50 in accordance with a program stored in the microcomputer 33. In the next step 52, various signals representing the upper-part temperature TRU, the representative temperature TRM, the upper-part setting temperature TLUP, the vehicle compartment setting temperature TL, the outside air temperature TA and the radiant heat of the sun Ts are inputted into the microcomputer 33 and stored respectively in the prescribed areas of the RAM. Thereafter, the thermal load in the vehicle compartment 21 is calculated in the form of a total signal T in accordance with the following equation.

$$T = K1 \cdot TRM + K2 \cdot TA + K3 \cdot TS - K4 \cdot TL + C1 \quad (1)$$

where K1, K2, K3, K4 and C1 are empirically determined constants.

After calculation of the total signal T in the step 54, the control goes to a step 56 in which various temperature controlling mechanisms for the main airflow passage 1, such as the selecting door 5, blower 7, refrigeration system, air-mix door 16 and mode doors 22a–22c are controlled in accordance with a prescribed basic pattern determined by the thus calculated total signal T, thus achieving a basic temperature control of the vehicle compartment 21.

Thereafter, a temperature control for the upper part of the vehicle compartment 21 is commenced from a step 58 onward, independently of the preceding steps.

At first, a desired comfortable upper-part temperature (desired upper-part temperature TRU') is calculated in the step 58 based on the outside air temperature TA, the radiant heat Ts of the sun and the setting upper-part temperature TLUP. The calculation is achieved by using the following equation.

$$TRU' = K5 \cdot TA + K6 \cdot Ts + K7 \cdot TLUP + C2 \quad (2)$$

where K5, K6, K7 and C2 are empirically determined constants.

Then, the control goes to a step 60 for calculating an opening for the cooled air bypass door 26.

In this step 60, the target upper-part temperature TRU' is subtracted from the upper-part temperature TUP, thus obtaining the difference ΔTRU [see the following equation (3)]. Then a desired operating opening θCB for the cooled air bypass door 26 which is proportional to the sum of the difference ΔTRU and an integral of ΔTRU is calculated by the following equation (4).

$$\Delta TRU = TRU' - TRU \quad (3)$$

$$\theta CB = K8 \left( \Delta TRU + \frac{1}{T_1} \int_0^{T_1} \Delta TRU\, dt \right) \quad (4)$$

where K8 is an empirically determined constant. Thus, the opening of the cooled air bypass door 26 is controlled by a proportional integral control system.

The cooled air bypass door 26 is driven in a step 62 to move in a position to assume the opening calculated in the step 60. Thereafter, the control returns from a step 64 to the start step 50.

As described above, when the upper-part temperature TRU deviates from the desired upper-part temperature TRU', the opening of the cooled air bypass door 26 is controlled by the proportional integral control system based on the deviation until the upper-part temperature TRU becomes equal to the desired upper-part temperature TRU'. Thus, the upper-part temperature is always maintained at the desired value even when environments inside and outside the vehicle compartment are caused to vary.

Obviously, various modifications and variations of the present invention are possible in the light of the above teaching. It is therefore to be understood that within the scope of the appended claims the present invention may be practiced otherwise than as specifically described.

What is claimed is:

1. A control apparatus for an automobile air-conditioner, comprising:
    (a) an airflow duct having defined therein a main airflow passage and a cooled air bypass passage, said main airflow passage having an evaporator disposed therein and a vent outlet at a downstream end thereof, said cooled air bypass passage bypassing said main airflow passage between a downstream side of said evaporator and said vent outlet for supplying cooled air from said evaporator directly to said vent outlet;

(b) a cooled air bypass door disposed in said cooled air bypass passage for regulating the amount of cooled air flowing through said cooled air bypassing passage;

(c) representative temperature detection means for detecting a representative temperature in a vehicle compartment;

(d) vehicle compartment temperature setting means for setting a desired vehicle compartment temperature;

(e) total signal calculation means for calculating a total signal corresponding to a thermal load in the vehicle compartment, based on at least said representative temperature and said desired vehicle compartment temperature;

(f) control means for controlling temperature control mechanisms of said main airflow passage based on said total signal, for achieving a basic temperature control of the vehicle compartment;

(g) upper-part temperature detection means for detecting a temperature of an upper part of the vehicle compartment in the vicinity of the driver's head;

(h) upper-part temperature setting means for setting a desired temperature for the upper part of the vehicle compartment;

(i) desired upper-part temperature calculation means for calculating a desired upper-part temperature based on at least said desired upper-part temperature set by said upper-part temperature setting means;

(j) opening calculation means for calculating an opening of said cooled air bypass door which is required to make the upper part temperature equal to said desired upper-part temperature; and (k) drive means for actuating said cooled air bypass door to a position in which said cooled air bypass door assumes said opening calculated by said opening calculation means.

2. A control apparatus according to claim 1, said desired upper-part temperature calculation means being operative to calculate a desired comfortable temperature in the vicinity of the driver's head based on at least a temperature outside the vehicle compartment, a radiant heat of the sun, and said desired upper-part temperature set by said upper-part temperature setting means.

3. A control means according to claim 1, said opening calculation means being operative to determine said opening of said cooled air bypass door according to a value which is a proportional integral to the difference between said calculated desired upper part temperature and said detected upper-part temperature.

* * * * *